Dec. 5, 1967 R. B. OLEN 3,356,337
BALL VALVE SEALING ELEMENT
Filed March 9, 1965 4 Sheets-Sheet 1

INVENTOR
Robert B. Olen
BY
ATTORNEY

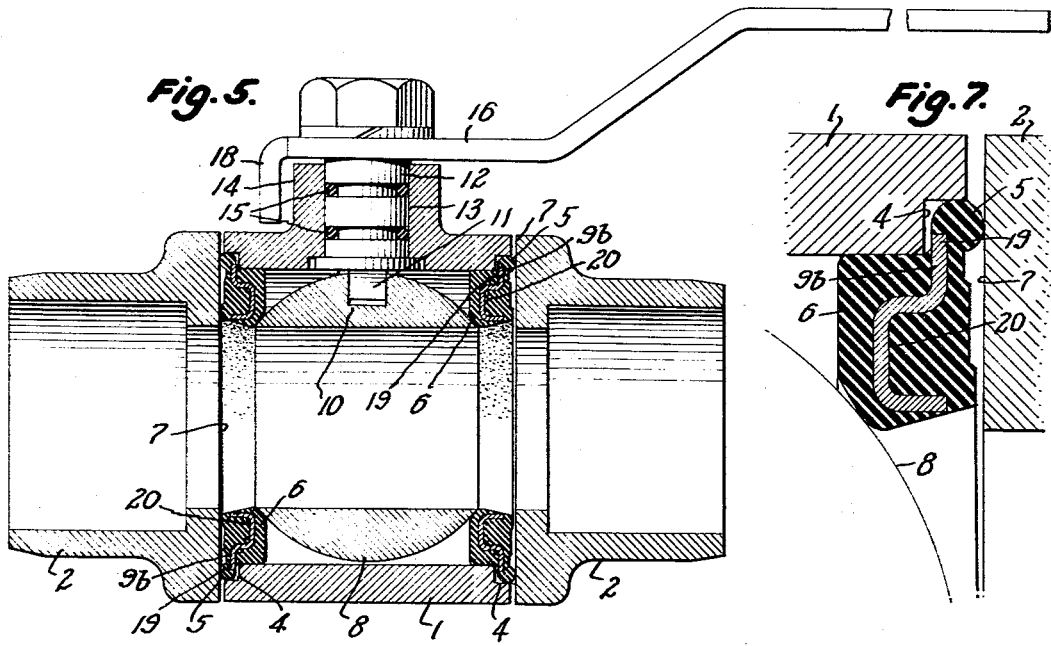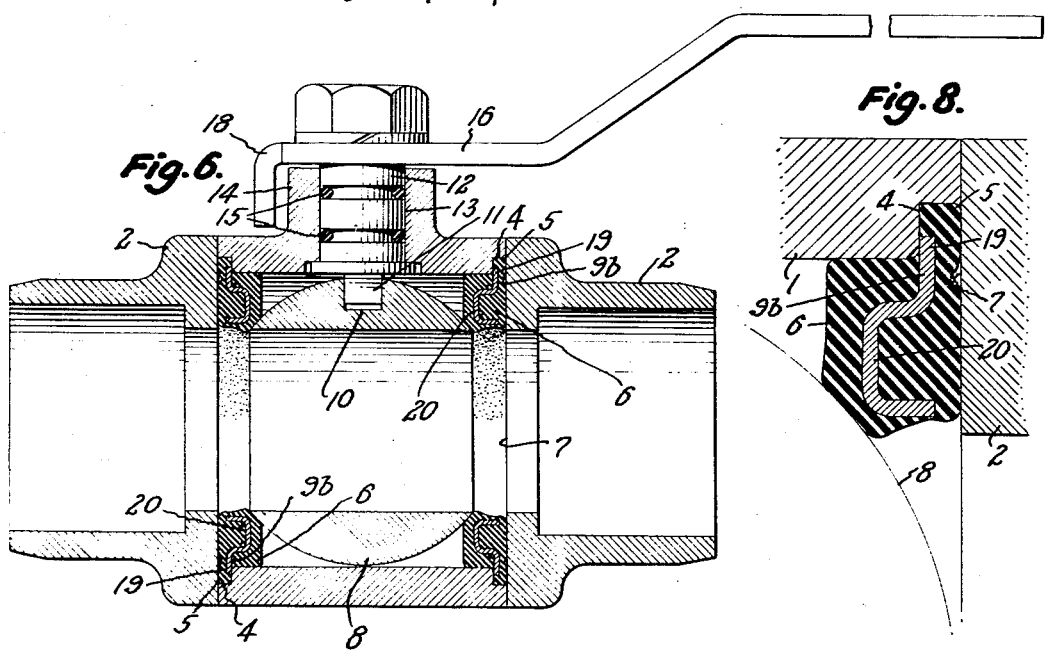

Dec. 5, 1967 R. B. OLEN 3,356,337
BALL VALVE SEALING ELEMENT
Filed March 3, 1965 4 Sheets-Sheet 3

INVENTOR
Robert B. Olen
BY
ATTORNEY

Dec. 5, 1967   R. B. OLEN   3,356,337
BALL VALVE SEALING ELEMENT
Filed March 9, 1965   4 Sheets-Sheet 4

INVENTOR
Robert B. Olen
by
ATTORNEY

United States Patent Office 3,356,337
Patented Dec. 5, 1967

3,356,337
BALL VALVE SEALING ELEMENT
Robert B. Olen, Akron, Ohio, assignor to The Ohio Injector Company, Wadsworth, Ohio, a corporation of Ohio
Filed Mar. 9, 1965, Ser. No. 438,339
4 Claims. (Cl. 251—315)

ABSTRACT OF THE DISCLOSURE

Sealing elements for the balls of ball valves and the joints between the valve bodies and end pieces, said sealing elements being formed of relatively yieldable elastomeric material provided with relatively rigid inserts embedded therein, whereby the valve bodies are made properly fluid tight; and the assembly of valves embodying such sealing elements and the method of manufacturing such sealing elements.

---

Figure 1:
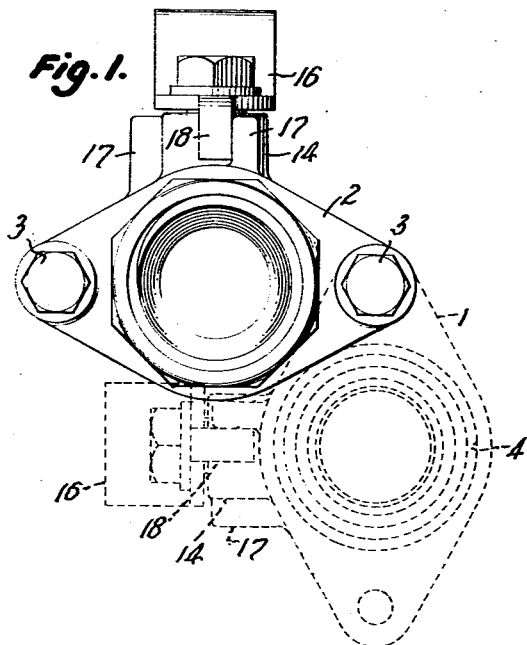

This invention relates to valves, particularly ball valves, and it has special reference to the sealing elements for the balls of such ball valves and for the joints between the valve bodies and end pieces, whereby the valve bodies are made properly fluid tight. Also, it relates to the assembly of valves embodying such sealing elements and the method of manufacturing such sealing elements.

The sealing elements of the invention are particularly well adapted for use in ball valves of the general types shown in the United States patents of Robert E. Sanctuary No. 2,930,576 of Mar. 29, 1960, and No. 2,963,263 of Dec. 6, 1960, and in the Australian patent of Saunders Valve Company Limited No. 149,684 of Jan. 19, 1953, wherein, when the valves are coupled by their end pieces in pipe lines, their bodies may be swung out of alignment with such pipe lines for access to their interiors and to the balls, and the sealing elements therefor, for servicing or replacement, but such sealing elements are not thus limited in their valve application.

Elastomer base sealing elements have a tendency to "wash-out" under the pressure force reaction at the critical point during opening and closing of the valve. Seal wash-out prevents valve closure and/or excessive damage to the seal, thereby causing the system in which the valve is installed to malfunction. Additionally, for three-piece bolted body ball valves, the adapter flanges of the end pieces require a seal to prevent fluid leakage to the atmosphere. The provision of two sealing elements for each end of the valve, as is now the most prevalent practice, is costly, and, in reference to the practice of the present invention, is unnecessary.

In accordance with the present invention, "wash-out" of the seal is prevented by integrally molding into the elastomeric sealing element a relatively rigid, preferably metallic, insert so designed that it may be positioned both axially and concentrically of the sealing element, and will not be distorted, during the molding process. Bonding agents either applied to the insert, or in the elastomeric material, will insure adhesion of the elastomeric material to the insert.

Moreover, the sealing element of the invention is so designed as to include an O-ring for sealing engagement between the valve body and an end piece, such O-ring being formed integral with the ball-sealing, or main, portion of the sealing element during the molding process and thereby doing away with the now somewhat prevalent two-part sealing means for each end of the valve body, simplifying installation of the sealing elements in the valve and serving thus to reduce production costs while improving the construction and functioning of the valve. Moreover, the provision of the one-piece sealing element and O-ring simplifies the servicing of valves without their removal from a pipe line or other functional installation, or without removal of the valves from the permanent plumbing installation, or, if a valve is to be removed from the plumbing installation, without disturbing such installation, inasmuch as the end pieces of the valve may remain in place on the pipe ends of the installation.

Furthermore, proper torquing of the bolts which connect the end pieces to the valve body containing the ball serves to establish between the sealing elements and the ball both an upstream and a downstream seal on the ball surface when the ball is in closed position.

Although in valves of relatively small size the relatively rigid insert of the sealing element need not necessarily have a support other than its embodiment in the material of the sealing element, in valves of relatively large size the said insert is so proportioned that a portion of its outer periphery extends into the area of the O-ring so as to be gripped against the flange of the valve body and between the flanges of the valve body and end piece, thus minimizing possible deflection of the insert and preventing separation of the O-ring portion from the main, or ball-engaging portion of the sealing element. This serves, also, to maintain retention of the upstream and downstream seal on the ball surface.

Moreover, the shape of the insert serves to limit ball movement inherent in "floating ball" types of valves, thus minimizing the amount of elastomeric material subjected to deformation when a pressure force reacts on the ball.

Having in mind the above defined features, and others which will appear hereinafter, it will be apparent that the primary object of the invention is to provide in a ball valve, sealing elements therefor, a method of forming such sealing elements, and a mode of assembling the sealing elements in operative association with the valve ball and body, whereby lower operating torques, minimum seal wear, extended seal and ball life and overall more satisfactory functioning of ball valves can be attained.

Although the invention as hereinbefore broadly described comprises sealing elements for valves, it may be more particularly defined as comprising sealing elements especially for ball valves, the method of making such sealing elements and the assembly of such sealing elements in operative combination with the valve body, ball and end pieces, the said sealing elements each comprising, as an integer, a major portion for sealing engagement with the surface of the valve ball and a circumferential projection, preferably in the form of an O-ring, to provide a seal between the valve body and an adjacent end piece, the major portion of the sealing element being pressed into sealing engagement with the valve ball and its O-ring projection being sealingly engaged between the body and adjacent end piece, by appropriate torquing of the connecting bolts of the body and end pieces and being thus held in such engagement during operation of the valve, undue distortion of the sealing element, with possible resultant "wash-out" of the seal, being guarded against by inclusion in the sealing element, as a part thereof, a relatively rigid, preferably metallic, insert, of disc form, such insert serving to reinforce the union between the major portion and annular projection, or O-ring, and in selected forms of the sealing element extending into that area of the said extension or O-ring which is clamped between the flanges of the valve body and end pieces, all as will be explained hereinafter more fully and finally claimed.

Figure 2:
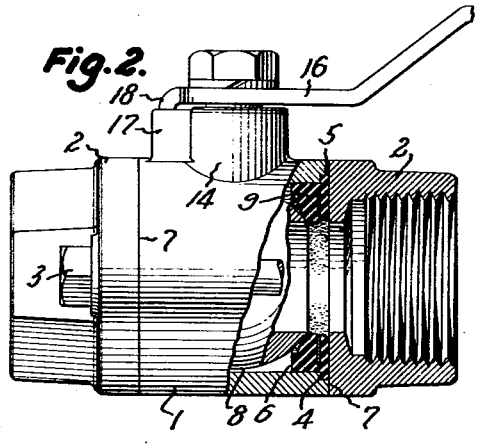
Figure 3:
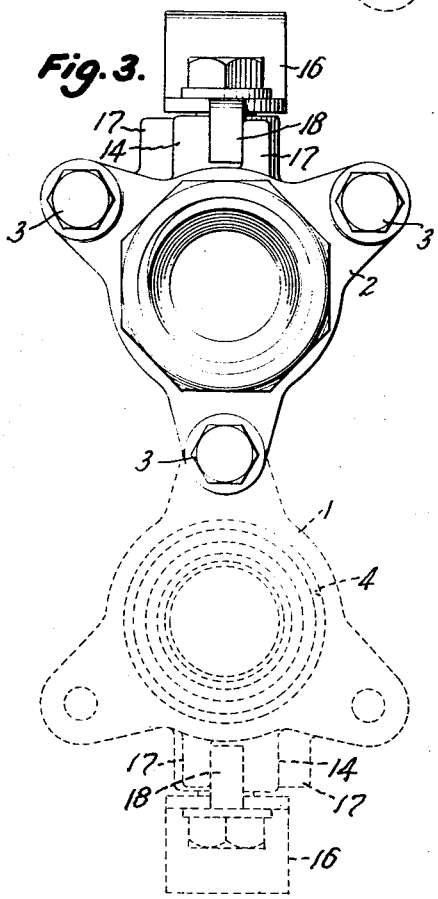
Figure 4:
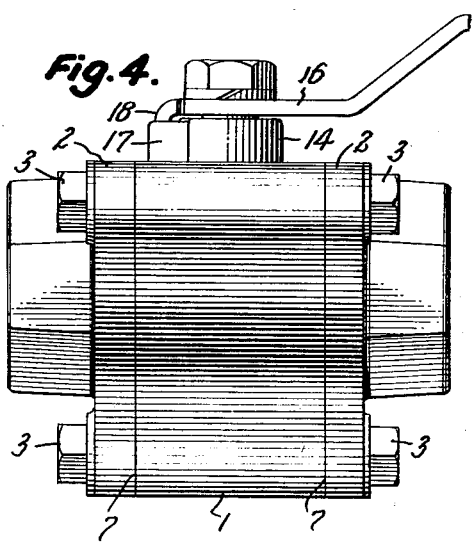
Figure 9:
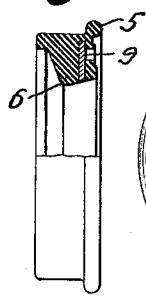
Figure 10:
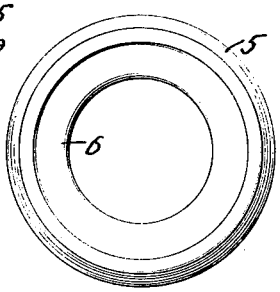
Figure 11:
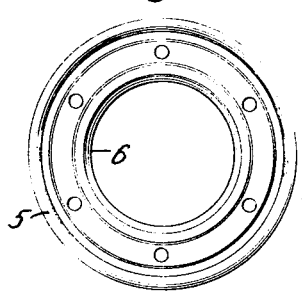
Figures 12, 13:
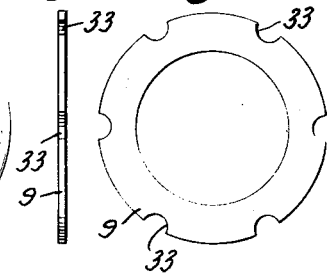
Figure 14:
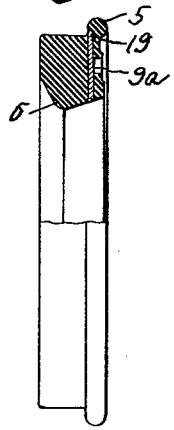
Figure 15:
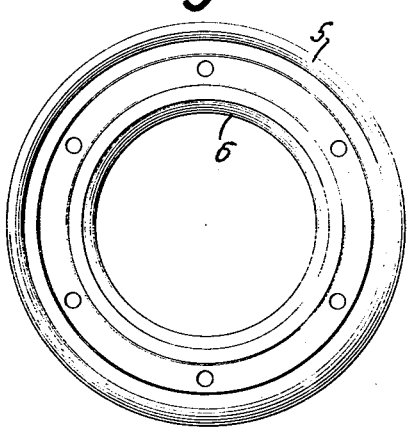
Figure 16:
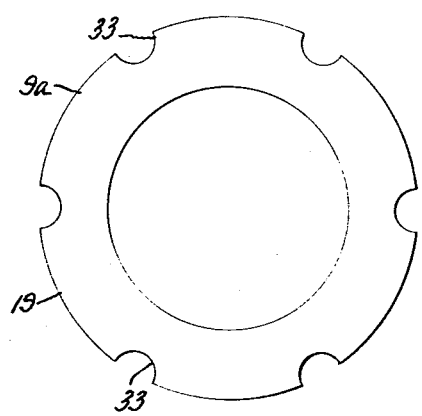
Figure 17:
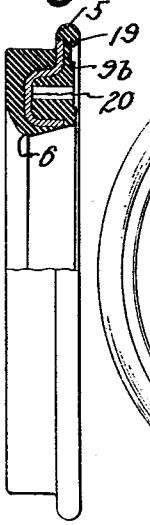
Figure 18:
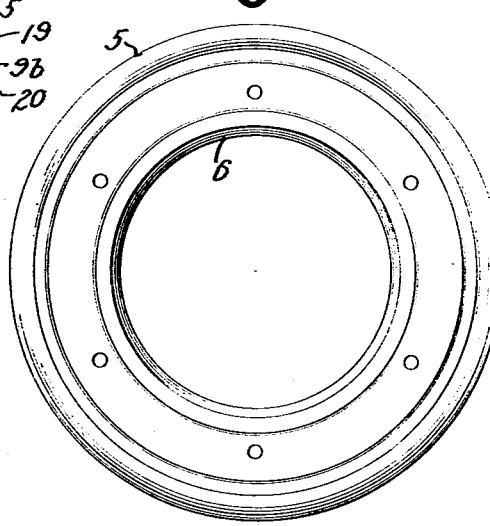
Figure 19:
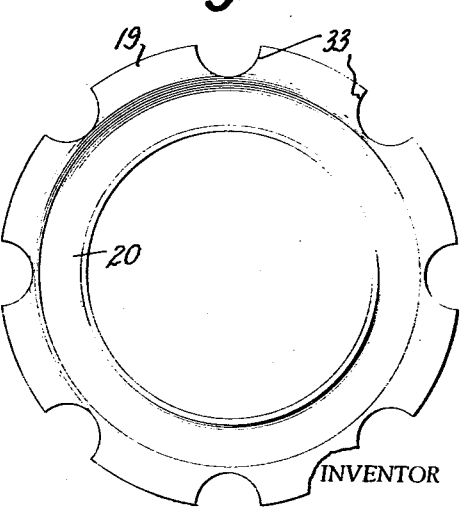
Figure 20:
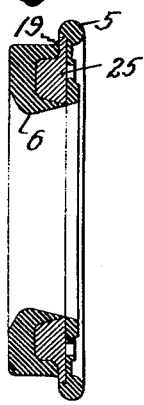
Figure 23:
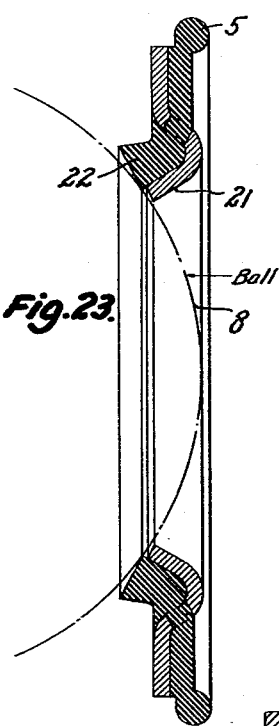
Figure 24:
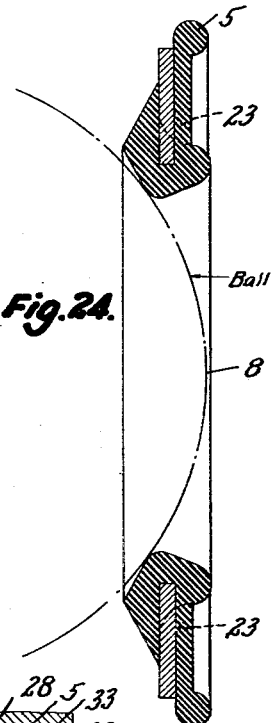
Figure 25:
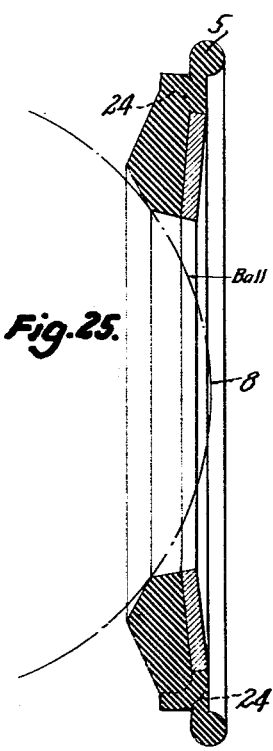
Figure 26:
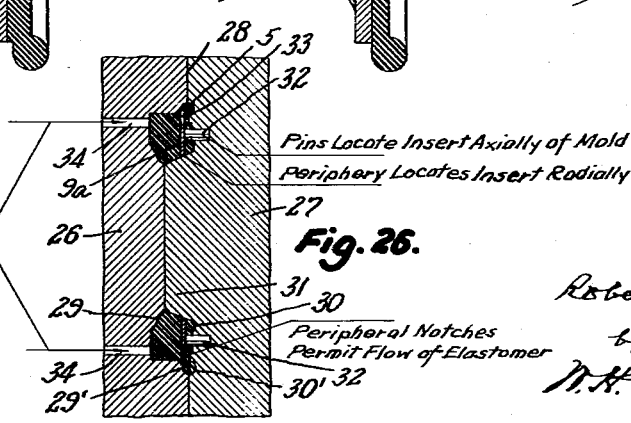

In the accompanying drawings illustrating the invention, in the several figures of which like parts are similarly designated, FIG. 1 is an end view of a ball valve representative of the type for which the sealing element of the invention is particularly designed, the body of the valve being shown swung open upon the end pieces in broken lines, FIG. 2 is a sectional side elevation of the valve shown in FIG. 1, FIG. 3 is a view similar to FIG. 1 but showing an embodiment of the valve best adapted for valves of large sizes, FIG. 4 is a side elevation of the valve shown in FIG. 3, FIG. 5 is an axial section of a valve of the general form shown in FIGS. 1 and 2, showing the sealing elements inserted in the ends of the body and in contact with the surface of the ball but with the end pieces not bolted home, FIG. 6 is a view similar to FIG. 5, but with the end pieces shown bolted home and the sealing elements compressed into sealing, operative condition, FIG. 7 is a greatly enlarged fragmentary sectional view showing the sealing element in the condition shown in FIG. 5, FIG. 8 is a view similar to FIG. 7 but showing the parts, including the sealing element, in the condition shown in FIG. 6, the distortion of the sealing element for proper sealing engagement with the valve ball and the flanges of the valve body and end piece being appropriately indicated, FIGS. 9 to 13 show one form of appropriate sealing element, particularly adapted for use in valves of relatively small sizes, and similar to that shown in FIG. 2; FIG. 9 being a sectional edge elevation, FIG. 10 being a face view as seen from the left of FIG. 9, FIG. 11 being a view of the opposite face of the element, FIG. 12 being an edge view of the insert, and FIG. 13 being a face view of such insert, FIGS. 14 to 16 show another form of sealing element; FIG. 14 being a sectional edge elevation, FIG. 15 being a face view as seen from the right of FIG. 14, and FIG. 16 being a face view of the insert, FIGS. 17 to 19 show an additional form of sealing element, particularly adapted for use in valves of relatively large sizes, and similar to that shown in FIGS. 5 to 8; FIG. 17 being a sectional edge elevation, FIG. 18 being a face view as seen from the right of FIG. 17, and FIG. 19 being a face view of the insert as seen from the right of FIG. 17, FIGS. 20 to 22 show still another form of sealing element which may be used in valves of a large range of sizes; FIG. 20 being a diametrical sectional elevation, FIG. 21 being a face view as seen from the right of FIG. 20, and FIG. 22 being a face view of the insert as seen from the left of FIG. 20, FIG. 23 is an enlarged diametrical sectional elevation of another form of sealing element having a modified form of insert and showing a valve ball portion in broken outline, FIG. 24 is a view similar to FIG. 23 showing a still further modification of the insert, FIG. 25 is a view similar to FIGS. 23 and 24 but showing an insert of a still further form, and FIG. 26 is a schematic sectional view illustrating the manner in which the inserts are positioned in a mold and the elastomeric material of the sealing elements is injected into such mold during the method of forming the sealing elements.

Referring particularly to FIGS. 1 and 2, it will be seen that the valve shown therein has a body 1 to which the end pieces 2 are secured by bolts 3, the body being swingable out of line with the axis of the end pieces 2 when one of the bolts 3 is removed and the other loosened, as is known in the art, to expose the interior of the body cavity for repair or replacement of the sealing elements and/or valve ball, when necessary or desirable, or for inspection of the parts, as indicated by the broken line showing of FIG. 1. This makes unnecessary disconnection from the pipe line. The ends of the valve body 1 are provided with similar annular seating recesses 4 for reception of the circumferential extensions, or O-rings, 5 of the sealing elements 6 (only one such element being shown), the end pieces 2 having interior planar faces 7 furnishing compressive bearing surfaces for engagement with both the annular extensions, or O-rings, 5, and the major portions of the sealing elements 6, whereby, when the end pieces are bolted home, the sealing elements will have proper assembly in relation to the body 1 and valve ball 8.

As shown in FIG. 2, and also in FIGS. 9 to 13, the sealing element has molded within it a relatively rigid, preferably metallic, insert 9 which, as has hereinbefore been indicated, serves to resist undue distortion of the sealing element during use of the valve, thus ensuring proper sealing engagement of its inner annular face with the surface of the valve ball 8 and retention of the pressure, or other, fluid passing through, or retained by, the valve.

As shown in FIGS. 5 and 6, the valve ball 8 is notched at 10 to receive the lug 11 of an operating stem 12 pressure sealed in the bore 13 of a body boss 14 by O-rings 15, or other appropriate packing means, and this stem 12 has bolted to its non-circular end (not shown) an operating lever or handle 16 by which the ball may be turned through an angle of 90° for opening and closing of the valve, the limits of movement being defined by stops 17 on the valve body with which an extension 18 of the handle 16 may engage, such stops being shown particularly in FIGS. 1 and 3, all as is conventional in ball valves.

It will be obvious to those skilled in this art that the end pieces 2 may be screw-threaded, as shown in FIGS. 1, 2 and 3, for threaded engagement with complemental pipe ends, or they may have plain interiors, as shown in FIGS. 5 and 6, for brazed, sweated or soldered engagement with complemental pipe ends, which is also conventional.

As shown in FIGS. 5 to 8, and also in FIGS. 17 to 19 which show similar types of sealing elements, and in FIGS. 14 to 16, 20 to 22, 23, 24 and 25, where the sealing elements are designed for use with valves of relatively large sizes, or are designed to handle fluids of considerable pressure, the relatively rigid inserts are, as hereinbefore indicated, so proportioned as to have a portion 19 of their outer peripheries extending into, or adjacent to, the annular extensions, or O-rings, 5 of the sealing elements in order that such peripheral portions 19 may be gripped within, or seated against, the bases of the circumferential seating recesses 4 of the valve body when the end pieces 2 are bolted home, thus serving to reinforce the connection between the said annular extensions, or O-rings, and the bodies of the sealing elements to prevent shearing under stress.

In FIGS. 14 to 16, the insert 9a is shown as a flat annulus with its peripheral portion 19 extending into the annular extension, or O-ring, 5 and lying at its inner face for direct contact with the base of the circumferential seating recess 4 of the valve body.

In FIGS. 5 to 8, and 17 to 19, which are similar in concept, the insert 9b not only has its peripheral portion 19 in substantially the same cooperative seating arrangement as that of FIGS. 14 to 16 but is provided with a circumferential offset portion or bead 20 whereby greater lateral (axial) rigidity is imparted to it to guard against undue distortion of the sealing element and ensure its proper sealing engagement with the valve ball 8.

In FIGS. 23, 24 and 25, the inserts are so formed and disposed in the sealing elements as to protect the annular extensions, or O-rings, 5 from shearing, inasmuch as these inserts will absorb a major portion of the compressive force exerted when the end pieces 2 are bolted home.

In addition, in the form shown in FIG. 23, the insert is provided with an extension 21 embracing the outer face of the valve ball-engaging portion 22 of the sealing element, and having a peripheral terminal edge extending closely adjacent to the surface of the valve ball so that upon such wear of the portion 22 of the sealing element as to render it not wholly efficient to prevent leakage the peripheral terminal edge of the extension 21 will engage the valve ball in sealing contact until such time as replacement of the sealing element may be made.

In the forms of inserts shown in FIGS. 24 and 25 offset stops 23 and 24 bent outwardly and inwardly from their inner and outer peripheries, respectively, will serve to absorb undue thrust of bolting home of the end pieces 2 and thus prevent injury to the valve ball-contacting bodies of the sealing elements and to their annular extensions, or O-rings, 5.

Figure 21:
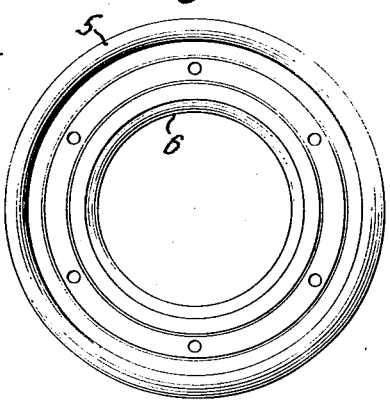
Figure 22:
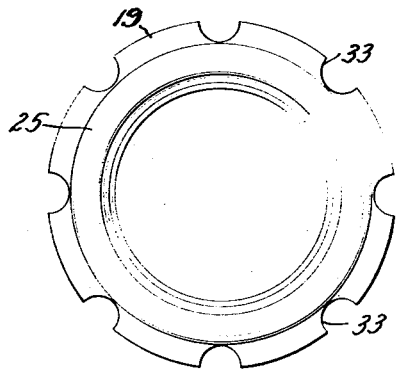

The insert 25 shown in FIGS. 20 to 22 is similar in form and contour to that of FIGS. 5 to 8 and 17 to 19 but instead of being made preferably of sheet metal, as are those latter forms, is made as a casting or stamping of solid metal, preferably brass.

Having reference to FIG. 26, it will be seen that the production of sealing elements in accordance with the invention, including, embedded in them, the inserts, may be reduced to a relatively simple molding operation. A two-part mold 26–27, having its line of cleavage 28 in the plane of the diameter of the circumferential extension, or O-ring, of the sealing element to be molded, has its mating faces circularly recessed at 29 and 30, respectively, in conformity with the inner and outer faces, and adjoining portions, of such sealing element, the mold part 27 being provided with a frusto-conical portion 31 and a circular arrangement of positioning pins 32, and the mold part 26, in order to accommodate molding of the circumferential extension, or O-ring, has a circumferential recess 29' mating with a similar recess 30' in the mold part 27 for formation, during molding, of the said circumferential extension or O-ring. The frusto-conical portion is so dimensioned that its perpihery will circumferentially engage the internal circumference of the insert, and thus support the insert radially of the mold, and the inner ends of the pins 32 will serve to support the insert axially of the mold in one direction. Moreover, when inserts of the types in which portions of their outer peripheries lie in juxtaposition to the circumferential extensions, or O-rings, such peripheral portions will be held in engagement with an adjacent face of the circumferential recess 29' by the pins 32, to thus support the insert in the other direction. It will be noted that, in all of the forms of the inserts used, their outer peripheries are provided with notches 33 serving to provide channels of clearance between the outer diameter of the mold cavity and the outer circumference of the insert positioned therein. Thus, when the mold parts 26 and 27 are closed, with an insert properly located in the mold cavity, the elastomeric material, such as natural or synthetic rubber, or other suitable chosen yieldable material, is introduced, under pressure, into the mold cavity through a plurality of circumferentially arranged sprues 34, such material will hold the metallic insert against the pins 32, assuming that the insert has no portion of its outer periphery supported, and will pass around such insert through the notches 33 in its periphery, and thus fill the entire mold cavity and embed the insert within the elastomeric material of the sealing element thus formed. Obviously, when the peripheral edge of an insert is supported by the adjacent face of the recess 29', and is axially supported also by the pins 32, the flow of the elastomeric material will be similar.

Various changes and modifications are considered to be within the principle of the invention and the scope of the following claims.

What I claim is:

1. A sealing element for a ball valve of the type having a body containing the valve ball and end pieces assembled with said body at the ends thereof, said sealing element comprising an annular member formed of an elastomeric material and provided with a main portion for sealing engagement with the valve ball and a circumferential extension for sealing interposition between the mating surfaces of the valve body and an end piece, said main portion and circumferential extension being integral, and a relatively rigid insert embedded in said main portion and serving to withstand undue distortion of said sealing element to thereby ensure its proper sealing function relative to said valve ball and to said valve body at the connection of the body with said end pieces, said insert having its periphery provided with notch means serving to permit flow of the elastomeric material around it during molding of the sealing element.

2. A sealing element as defined in claim 1, in which a portion of the outer periphery of said relatively rigid insert lies in juxtaposition to an area of said circumferential extension.

3. A sealing element as defined in claim 2, in which said portion of the periphery of said insert is exposed on that face of said circumferential extension which is adapted to contact the complemental surface of said valve body.

4. A ball valve having a body provided with a bore for fluid passage, an apertured valve ball rotatable in said bore and confined in operative position therein by annular sealing elements disposed in sealing engagement with the ball surface and disposed adjacent to the ends of said bore, and end pieces for said body provided with fluid passages complemental to said bore and said valve aperture and adapted when bolted to said body to compress said sealing elements into sealing engagement with said ball, said sealing elements being provided with relatively rigid annular inserts arranged normal to said bore and serving to counteract any tendency for undue distortion of said sealing elements during operation of said valve to thereby enhance the sealing engagement of said sealing elements with said ball, the bore of said body being provided at its ends with annular seating recesses and said sealing elements being provided with circumferential extensions for seating in said seating recesses and for compression in said recesses by said end pieces, and said annular inserts having a portion of their peripheries in juxtaposition to the bases of said seating recesses, whereby said inserts are supported by said body and through said circumferential extensions by said end pieces.

References Cited

UNITED STATES PATENTS

| 2,310,583 | 2/1943 | Johnson | 251—317 |
| 2,768,806 | 10/1956 | Koehler | 251—317 X |
| 3,014,690 | 12/1961 | Boteler | 251—315 X |
| 3,244,398 | 4/1966 | Scaramucci | 251—358 X |
| 3,272,472 | 9/1966 | Goldman | 252—309 X |

FOREIGN PATENTS 567,554  12/1958  Canada.

M. CARY NELSON, *Primary Examiner.*

M. O. STURM, *Assistant Examiner.*